United States Patent
Beaty

(10) Patent No.: US 9,740,285 B2
(45) Date of Patent: *Aug. 22, 2017

(54) SYSTEMS AND METHODS FOR CONTROLLING USER DEVICES BASED ON BRAIN ACTIVITY

(71) Applicant: Rovi Guides, Inc., San Carlos, CA (US)

(72) Inventor: Richard M. Beaty, Mannford, OK (US)

(73) Assignee: Rovi Guides, Inc., San Carlos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/232,081

(22) Filed: Aug. 9, 2016

(65) Prior Publication Data

US 2016/0349841 A1 Dec. 1, 2016

Related U.S. Application Data

(63) Continuation of application No. 14/230,997, filed on Mar. 31, 2014, now Pat. No. 9,436,279.

(51) Int. Cl.
| | | |
|---|---|---|
| G06F 3/00 | (2006.01) | |
| G06F 3/01 | (2006.01) | |
| H04N 21/422 | (2011.01) | |
| H04N 21/47 | (2011.01) | |
| H04N 21/41 | (2011.01) | |
| H04N 21/442 | (2011.01) | |

(52) U.S. Cl.
CPC .............. *G06F 3/015* (2013.01); *G06F 3/011* (2013.01); *H04N 21/4131* (2013.01); *H04N 21/42201* (2013.01); *H04N 21/44218* (2013.01); *H04N 21/47* (2013.01)

(58) Field of Classification Search
CPC ................................ G06F 3/015; G06F 3/1613
See application file for complete search history.

(56) References Cited

U.S. PATENT DOCUMENTS

2009/0187114 A1* 7/2009 Morikawa ............... G06F 3/015
600/545

* cited by examiner

*Primary Examiner* — Chanh Nguyen
*Assistant Examiner* — Sepehr Azari
(74) *Attorney, Agent, or Firm* — Ropes & Gray LLP

(57) ABSTRACT

Methods and systems described herein provide for an integrated approach for controlling a user's various devices based on the user's brain activity. A user's brain activity is monitored with a first user device. A change in the brain activity is detected. In response to detecting the change, data from a second user device is processed. The detected change in brain activity is compared to the processed data to determine whether the change in brain activity is associated with the second user device. In response to determining that the change is associated with the second user device, an option is generated for display on a display screen to control the second user device.

20 Claims, 5 Drawing Sheets

500

520

540

SYSTEMS AND METHODS FOR CONTROLLING USER DEVICES BASED ON BRAIN ACTIVITY

CROSS-REFERENCE TO RELATED APPLICATIONS

This application is a continuation of U.S. application Ser. No. 14/230,997, filed Mar. 31, 2014, currently allowed, which is hereby incorporated by reference in its entirety.

BACKGROUND

Users may rely on multiple types of devices to perform their daily activities. For example, a user may watch television on a home television set, listen to music and communicate with others on a smartphone, and play games and browse the Internet on a tablet. In conventional systems, each of these media devices has its own and separate interface. Thus, users may often switch from one interaction mode to another in order to perform their daily tasks. Moreover, interaction modes are conventionally limited to manual input from a user. To consume content on a television set, a user typically must issue commands by manually pressing buttons on a remote control. For smartphones and tablets, a user typically provides commands by tapping on various areas of the screen. Thus, conventional systems lack an integrated approach for conveniently interacting with a user's various devices.

SUMMARY

Accordingly, systems and methods are described herein for controlling a user's various devices through a common interaction mode based on the user's brain activity. By monitoring a user's brain activity to determine when events occur and on which of the user's devices the event occur, the systems and methods described may automatically determine which display prompts to provide to a user to appropriately respond to the event. As such, the systems and methods described provide an integrated and seamless approach for interacting with a user's various devices.

For example, a user may be watching television on a home television set and receive a phone call on a smartphone. A brain activity monitor may detect a drop in the user's attention level and determine that the drop in attention level was caused by a phone call that originated from the user's smartphone. The system may then provide the user with a display prompt for responding to the phone call.

In some aspects, the systems and methods described may monitor brain activity of a user with a first user device. For example, the first user device may be a wearable device containing an electroencephalogram unit (EEG) responsible for sensing electrical activity in the brain. At some point, the user device may detect a change in brain activity. For example, the change may be a drop in the user's attention level. In response to detecting the change in brain activity, the user device may process data from a second user device (e.g., mobile phone, a tablet, a laptop computer, or a desktop computer). For example, the data may be event data that is logged and stored on the second user device, and processing the data may involve, but is not limited to, determining when a given event (e.g., phone call) occurred on the second user device to the nearest millisecond. The user device may compare the processed data to the detected change in brain activity. For example, the time the event occurred (e.g., when the incoming phone call was received) may closely correspond to the time the change in brain activity was detected. In response to determining that the change is associated with the second user device, the user device may generate for display an option to control the second user device on a display screen. For example, in response to determining that the phone call came from the user's smartphone, a prompt that asks the user to answer or ignore the call may be provided on a display screen.

In some embodiments, the display screen is associated with a third user device. For example, the third user device may be the television set, so that the display of the option appears on the television set screen and interrupts the program that the user is currently watching. In other embodiments, the third user device may be a set top box which communicates with the television set screen.

Alternatively, the display screen is incorporated into the first user device (e.g., in a heads-up display). For example, the first user device may be a wearable computer that has an optical head-mounted display.

In some embodiments, the systems and methods described provide for generating for display an option to control a third user device. For example, the display screen of the first user device (e.g., optical head-mounted display of a wearable computer) may display an option which allows the user to control the third user device (e.g., television set, set top box). For example, this option may allow a user to view supplementary information about a program that is currently playing on a television set or in a media guidance list. Once a user selects the option to view supplementary information about the program via the optical head-mounted display, the wearable computer may send instructions to the set top box associated with the television set to retrieve supplementary information about the program of interest.

In some embodiments, the systems and methods described provide for detecting a differential in the user's brain activity and comparing this differential to a threshold to determine whether the detected differential corresponds to an interruption in the user's attention level. For example, the first user device may determine a control beta wave pattern representing a user's normal state of concentration. This control wave pattern may be associated with an average control amplitude. While monitoring the user's brain activity, an EEG may detect a variance of the user's beta waves and compare the average amplitude of this new beta wave to the average control amplitude. If the average amplitude of the new wave is higher than the average control amplitude, the EEG may determine that the detected differential corresponds to the user's attention being interrupted.

In some embodiments, the systems and methods described provide for cross-referencing the data from the second user device in a cross-referencing database, in which the database includes associations with changes in brain activity. Based on the associations, a user device (e.g., the first user device or the second user device) or remote server determines that one of the changes in brain activity in the database is associated with the data. For example, the data from the second user device may be information related to events that occurred on the second user device within a certain period of time (e.g., 1 minute ago). The database may associate that event (e.g., phone call) with a particular change in brain activity. For example, this change in brain activity may be represented by a brain wave pattern corresponding to a drop in attention level. In another example, this change in brain activity may be represented by certain numerically measured characteristics of the change in brain activity (e.g., change in average amplitude, change in average frequency, change in peak amplitude, change in peak frequency, etc.). In yet another example, this change may be represented by a combination of brain wave patterns and numerical measurements.

In some embodiments, the systems and methods compare the processed data from the second user device to the detected change in brain activity by determining that an event occurred at the second user device based on the processed data and determining that the time the event occurred corresponds to the time the change in brain activity was detected. For example, the data may be generated immediately in response to an event (e.g., phone call) occurring on a smartphone. This data may indicate that an incoming call was received at 12:00:45. The EEG may detect that there was significant change in brain activity at 12:01:00. Based on the close correspondence of times, the EEG may conclude that the phone ring on the user's smartphone caused the change in brain activity.

In some embodiments, the systems and methods described provide for selecting the option to control the second user device based on brain activity of the user after the change is detected. For example, an EEG of the first user device may compare brain activity of the user to certain known brain wave patterns that correspond to affirmative responses (e.g., answering "yes" to a question in a display prompt) and negative responses (e.g., answering no to a question in a display prompt). In another example, the EEG may determine the mood of the user after the change occurs to decide which option to select. For example, if the user's mood is annoyance, the first user device may automatically select an option for ignoring the phone call to display to the user. On the other hand, if the user's mood is happiness or excitement, the first user device may automatically select an option for answering the phone call.

In some embodiments, the systems and methods described provide for receiving an input from the user to select the displayed option, in which the input is a facial feature of a particular brain wave pattern. For example, the user may set up facial gestures to represent different types of responses. For example, a deliberate and sustained blinking of the both eyes may represent a selection of an option.

It should be noted, the systems and/or methods described above may be combined with, applied to, or used in accordance with, other systems, methods and/or apparatuses discussed both above and below.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF DRAWINGS

Figure 1:
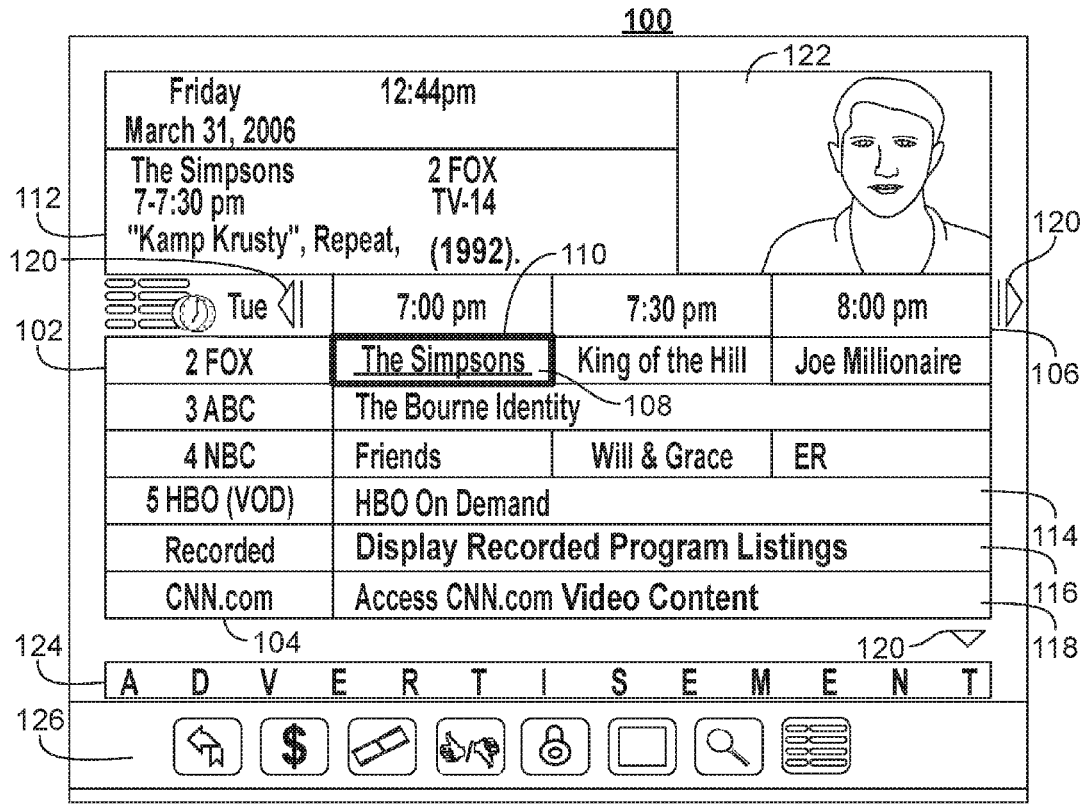
FIG. 1 is a diagram of an interactive grid display in accordance with some embodiments of the disclosure.

Methods and systems are described herein for controlling multiple user devices based on a user's brain activity. Options for controlling these user devices may be displayed as part of a media guide application. For example, these options may be displayed on a television set while a user is watching a program or browsing a media guide.

As the amount of content available to users in any given content delivery system can be substantial, many users desire a form of media guidance through an interface that allows users to efficiently navigate content selections, or easily identify content that they may desire. An application that provides such guidance is referred to herein as an interactive media guidance application or, sometimes, a media guidance application or a guidance application. These guidance applications may allow a user to perform functions on one or more devices. These functions may be provided as options to a user in response to an event that occurred at a user's device. As referred to herein, an "event" should be understood to mean any activity that occurs on or near a user device. For example, events that occur on a user device may include, but are not limited to, receiving incoming phone calls, emails, text messages, video chats, calendar alerts, invitations, alarms, reminders, etc. In another example, events that occur near a user device may include, but are not limited to, a door knock, a baby crying, a person yelling, ringing of an oven or microwave timer, buzzing of a laundry buzzer, and conversations of new people in the room. As referred to herein, an "event identifier" should be understood to mean any information that is used to distinguish one event from another in the list of events, including but not limited to name (e.g., "phone call"), process ID, generated by the second user device, and a combination of descriptors and numerical identifiers.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices which they traditionally did not use. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. As referred to herein, "first user device" should be understood to mean any user device that a user is currently directly interacting with. As referred to herein, "second user device" should be understood to mean any user device that a user is not currently directly interacting with. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

In some embodiments, a user device may be configured to monitor brain activity upon which various media guidance application operations and features may be based. For example, based on brain activity information, the media guidance application may recommend media assets that correspond to a mood of a user or are likely to induce a preferred mood of the user, provide on-screen feedback about current brain activity of the user, adjust media assets and/or media guides in order to compensate for unusual brain activity in distinct areas of the brain, adjust power levels in the user device, and/or any combinations thereof.

In some embodiments, the user device may incorporate and/or have access to an electroencephalogram unit ("EEG"). An EEG measures electrical activity associated with a brain of a user. For example, an EEG may measure voltage fluctuations and/or the frequency or frequency range of voltage fluctuations generated by the brain of a user.

For example, an EEG may describe rhythmic brain activity. Rhythmic activity (e.g., activity associated with neural oscillation) also known as brain waves may be described in terms of frequency bands or frequency ranges. For example, a delta band includes a frequency range of up to about 4 Hz with a typical amplitude of 20-200 microvolts. Delta bands are, in some circumstances, associated with a sleeping state of a user. Theta bands include a frequency range of 4 to 8 Hz with a typical amplitude of 10 microvolts. Theta bands are, in some circumstances, associated with drowsiness. Alpha bands include a frequency range of 8 to 13 Hz with a typical amplitude of 20-200 microvolts. Alpha bands are, in some circumstances, associated with a relaxed state and/or the blinking of a user's eyes. Beta bands include frequencies of 13 to 30 Hz with a typical amplitude of 5-10 microvolts. Beta bands are, in some circumstances, associated with alertness, concentration, and/or anxiety. Gamma bands include a frequency range of 30 to 100 Hz and may have various amplitudes. Gamma bands are, in some circumstances, associated with combinations of senses of a user (e.g., sight, smell, sound, touch, taste) and/or short term memory. Frequency bands and frequency ranges as well as the symmetry of these bands and ranges across the brain of a user are also associated with various moods, which is discussed in detail in Rybak, "Frontal Alpha Power Asymmetry in Aggressive Children and Adolescents With Mood and Disruptive Behavior Disorders," Clinical EEL and Neuroscience, Vol. 3, 2006, which is hereby incorporated by reference herein in its entirety.

Additional discussion about the use of EEG's to detect a level of attention, engagement, frustration, anxiety, emotional state, and comprehension are discussed in detail in Wyczesany, Miroslaw et al., "Subjective mood estimation co-varies with spectral power EEG characteristics," Department of Psychophysiology, Jagiellonian University, Krakow, Poland, Acta Neurobiol Exp, 68: 180-192, 2008, Tan, Bao Hong, "Using a Low-cost EEG Sensor to Detect Mental States, CMU-CS-12-134, School of Computer Science, Carnegie Mellon University, August 2012, Hamadicharef et al., "Learning EEG-based Spectral-Spatial Patterns for Attention Level Measurement," Institute for Infocomm Research, 2009, Bos, Danny Oude, "EEG-based Emotion Recognition, The Influence of Visual and Auditory Stimuli," Department of Computer Science, University of Twente, 2006, and Pradeep et al., U.S. Pat. No. 8,392,250, issued Mar. 5, 2013, which are hereby incorporated by reference herein in their entireties.

In some embodiments, the user device incorporates and/or has access to an electromyogram unit ("EMG"). An EMG measures the electrical activity of muscles at rest and during contraction. The use of EMG and EEG for providing biofeedback is discussed in detail in Frank et al., "Biofeedback in medicine: who, when, why and how?" Ment. Health Fam. Med., June 2010, and Wartena et al., U.S. Patent Application Publication No. 2012/0029322, filed Mar. 24, 2010, which is hereby incorporated by reference herein in its entirety. In some embodiments, the user device may include additional components for detecting brain activity, moods, and attentiveness of a user as discussed in detail in Lee et al., U.S. Pat. No. 8,332,883, issued Dec. 11, 2012, and Bill, U.S. Pat. No. 8,373,768, issued Feb. 12, 2013, which are hereby incorporated by reference herein in their entireties.

In some embodiments, a user device may also distinguish between the different areas of the brain and the different functions of each area of the brain. For example, the frontal lobes are typically associated with planning, problem-solving, voluntary motor control, cognition, intelligence, attention, language processing and comprehension, and various emotions. The parietal lobe is typically associated with perception and integration of somatosensory information (e.g., touch, pressure, temperature, and pain) visuospatial processing, spatial attention, spatial mapping, and number representation. The occipital lobe is typically associated with vision, including color, orientation, and motion. The temporal lobe is typically associated with recognition, perception, hearing, smell, and memory. The regions and functions of the brain, in particular their effect on attention and emotion are discussed in detail in Yamasaki et al., "Dissociable prefrontal brain systems for attention and emotion," PNAS, vol. 99, no. 17, 2002, which is hereby incorporated by reference in its entirety.

In some embodiments, a user device may be configured as a headset. As used herein a "headset" refers to any device or article worn or affixed to a user for monitoring brain activity. For example, a user device for monitoring brain activity may be fashioned as a pair of headphones, a hat, a helmet, a pair of glasses, and/or other configuration for use by a user. In some embodiments, a headset may be powered by a local energy storage device (e.g., a battery). For example, in some embodiments, a headset may be rechargeable and/or include replaceable energy storage devices.

The media guidance application (or a user device upon which the media guidance application is implemented) may manage power consumption of the user device based on brain activity of a user. For example, the media guidance application may operate in a plurality of modes each associated with a power consumption and/or sensitivity level. For example, the media guidance application (or the user device upon which the media guidance application is implemented) may trigger various modes on the user device based on a change (or lack of change during a period of time) in brain activity (e.g., a brain state, frequency range, etc.).

Additionally or alternatively, the media guidance application (or the user device upon which the media guidance application is implemented) may trigger various modes on the user device for detecting brain activity based on the particular media guidance operation being performed (or not being performed). For example, the media guidance application may determine that a particular mode (e.g., with a particular power consumption level and/or sensitivity level) corresponds to determining a mood or a user, whereas a different mode corresponds to determining an attentiveness level of a user.

For example, in response to a user request to perform media guidance operations (e.g., schedule a recording) based on monitored brain activity, the media guidance application may initiate a first mode, and, in response to receiving a user request, to perform a different media guidance operation (e.g., recommend a media listing based on a mood of the user), the media guidance application may initiate a second mode. Furthermore, the media guidance application may automatically adjust the various modes initiated and/or switch from one mode to another. For example, in response to detecting the brain activity of the user does not correspond to a threshold range of brain activity (e.g., associated with actively performing media guidance application operations), the media guidance application may change from a first mode to the second mode (e.g., associated with non-actively performing media guidance applications). This "sleep" or "stand-by" mode may feature reduce power consumption levels and/or sensitivity levels, which may be beneficial in conserving energy consumption as well as reducing a user's exposure to the techniques used to monitor the brain activity.

For example, the media guidance application (or a user device upon which the media guidance application is implemented) may include a "sleep mode" (e.g., a lower powered/lower sensitivity mode) that is initiated after prolonged periods of similar brain activity and/or repetitive brain activity cycles (e.g., indicating that the user is sleeping, engaged in a repetitive activity, and/or does not currently need to perform any media guidance application operations. For example, the media guidance application may initiate the sleep mode in response to determining that the brain activity of the user has dropped below a first threshold range (e.g., associated with an awake user). In another example, the media guidance application may detect that the brain activity of the user exceeds a second threshold range (e.g., associated with a sleeping user), and in response, initiate an "active mode."

In some embodiments, a media guidance application (or a user device upon which the media guidance application is implemented) may detect and/or monitor brain activity of a user. In some embodiments, the media guidance application may determine whether or not the brain activity of a user corresponds to a threshold range. As referred to herein, a "threshold range" refers to a frequency range and/or amplitude of brain activity that defines the boundaries of a brain state. For example, a threshold range may be defined as a particular frequency range (in Hz) associated with a brain state of a user, may be defined as frequency bands associated with a brain state of a user, and/or may be defined according to any other measurement that describes the current, preferred, past, and/or future brain state of a user. In some embodiments, a threshold range may account for any transient variations and amplitudes in brain state. For example, a threshold range may be defined as an average amplitude, frequency, frequency range, and/or frequency band over a particular period of time. In addition, a threshold range may refer to a composite range that includes one or more amplitudes and/or frequencies associated with one or more waves. For example, in some embodiments, a particular brain state may correspond to brain activity corresponding to theta bands with a first amplitude and delta bands at a second amplitude.

It should also be noted that in some embodiments, a threshold range may itself include one or more threshold ranges. For example, a threshold range associated with one brain state (e.g., a user being awake) may itself include numerous other threshold ranges (e.g., a mood of the user, an attentiveness level of the user, etc.).

As referred to herein, a "brain state" refers to a qualitative assessment of the mood, level of anxiety, level of attentiveness, level of comprehension, level of proficiency associated with one or more functions (e.g., reading text on a screen, hearing audio, etc.) of a user, and/or a combination thereof associated with the brain activity of the user. A brain state can be quantified as corresponding to a particular threshold range, and different brain states may be compared based on their corresponding threshold ranges.

Brain states may be identified by a user device (e.g., upon which a media guidance application is implemented) that incorporates and/or have access to a device for monitoring brain waves (e.g., an EEG, EMG, and/or any other device discussed herein). The media guidance application may monitor the brain activity (e.g., brain waves) of a user and determine a first brain state of the user based on the brain activity. The first brain state (e.g., the current frequency range of voltage fluctuations in the brain, electrical activity of muscles near the brain at rest and during contraction, and/or threshold range) may correspond to a first mood of the user. The media guidance application may also select a second brain state (e.g., a preferred frequency range of voltage fluctuations in the brain, electrical activity of muscles near the brain at rest and during contraction, and/or threshold range) that corresponds to a second mood of the user. The media guidance application may compare the first brain state to the second brain state (e.g., compare the frequency range of voltage fluctuations in the brain, electrical activity of muscles near the brain at rest and during contraction, and/or threshold range associated with the first state to the frequency range of voltage fluctuations in the brain, electrical activity of muscles near the brain at rest and during contraction, and/or threshold range associated with the second state) to determine whether two states corresponds (e.g., indicate the same frequency range of voltage fluctuations in the brain, electrical activity of muscles near the brain at rest and during contraction, and/or threshold range). In response to determining the first brain state does not corresponds to the second brain state, the media guidance application may generate a display of a media asset to the user that is associated with inducing the second brain state. Further details about generating media assets based on detecting mood from monitoring the user's brain activity are discussed by Klappert et al. in U.S. patent application Ser. No. 14/038,158, filed Sep. 26, 2013, which is hereby incorporated by reference herein in its entirety.

For example, in response to determining that a user is not in a preferred mood, the media guidance application may generate for display one or more media assets associated with inducing a particular mood. Additionally or alternatively, in response to determining that the user is in a particular mood, the media guidance application may match media assets to that particular mood. To select a particular media asset, the media guidance application may compare the data associated with the current brain state of the user to a preferred, selected, and/or ideal brain state of the user.

To determine a mood corresponding to a brain state, the media guidance application may cross-reference data associated with the brain state of the user (e.g., a frequency range, an electrical activity of the muscles near the brain, and/or a threshold range) with a database associated with data related to brain states and corresponding moods. For example, based on the cross-reference, the media guidance application may determine that the data associated with the brain state of the user indicates that the user is confused, nervous, etc. The media guidance may then select a new brain state (e.g., corresponding to a preferred mood, attentiveness level, etc.) based on a current time, a user input, a current activity, or a preferred biorhythmic pattern associated with the user.

For example, the media guidance application may receive instructions from the user indicating that the user wishes to be in a particular mood (e.g., happy) every evening at six o'clock PM. In response, the media guidance application may ensure the user is happy at that time by generating a display of a media asset that is associated with happiness of the user at six o'clock PM. In another example, the media guidance application may receive instructions from the user indicating that the user wishes to follow a particular schedule for his/her biorhythmic activity (e.g., the user wishes to maintain a therapeutic gradual increase and decrease in brain activity, frequency bands, etc.) In response, the media guidance ensures the brain activity of the user corresponds to the schedule, and if not, generates a display of a media asset (e.g., a movie that corresponds to the current brain activity of the schedule, a display of textual instructions such as "Calm Down," "Relax," "Breath Deeply," "Concentrate," associated with maintaining the schedule).

To select a media asset for display, the media guidance application may cross-reference a preferred brain state with a database that includes a plurality of previous brain states of the user (e.g., representing various moods, attentiveness levels, etc.) and corresponding categories of media assets that the user was consuming during each of the previous brain states. In response to determining a media asset is of the category of media assets that the user was consuming during a previous brain state corresponding to the second brain state, the media guidance application selects the media asset for display to the user.

The media guidance application may also calibrate and/or perform a training/set-up mode. For example, the media guidance application may receive information from the user, in which the user describes and/or rates current brain states of the user. For example, during calibration, the media guidance application may detect a brain state and ask the user to describe the brain (e.g., designate the state as associated with a particular mood). The current brain state of the user (e.g., the current threshold range) will then be designated as corresponding to the particular mood. Additionally or alternatively, the media guidance application may receive instructions designating a particular brain state as corresponding to a particular mood. For example, the media guidance application may retrieve/receive instructions that indicate that a threshold range of 8 to 10 Hz indicates that the particular user is in a happy mood. Additionally, the media guidance application may retrieve/receive instructions that indicate that a threshold range of 10 to 13 Hz indicates that the particular user is in a sad mood. In another example, if the average amplitude of a threshold range is 50 microvolts and an average frequency range is 7 Hz, the media guidance application may determine that the threshold range indicates that a user is currently anxious.

The media guidance application may also offer training opportunities. For example, the media guidance application may generate for display media assets in sequence in order to sway or induce a user into a particular brain state. The media guidance application may also offer tips or instructions for achieving a particular brain state. For example, the media guidance application may generate on-screen instructions for achieving and/or maintaining particular brain states (e.g., moods, attentiveness levels, etc.).

The media guidance application may perform numerous operations for the user. As referred to herein, a "media guidance application operation" refers to any operation corresponding to providing, receiving, and generating media guidance data for consumption by a user. For example, media guidance application operations include displaying media guidance data, providing options to navigate, select, and edit media guidance data or content (e.g., a media asset) associated with media guidance data, and/or manipulating a device used to access (e.g., a display device), retrieve (e.g., a server), and/or associate media guidance data with a user (e.g., a user device for monitoring brain activity). One of the operations of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Other operations of a media guidance application are to play media assets and provide fast access playback operations for those media assets. As referred to herein, the phrase "fast-access playback operations" should be understood to mean any operation that pertains to playing back a non-linear media asset faster than normal playback speed or in a different order than the media asset is designed to be played, such as a fast-forward, rewind, skip, chapter selection, segment selection, skip segment, jump segment, next segment, previous segment, skip advertisement or commercial, next chapter, previous chapter or any other operation that does not play back the media asset at normal playback speed. The fast-access playback operation may be any playback operation that is not "play," where the play operation plays back the media asset at normal playback speed.

Figure 2:
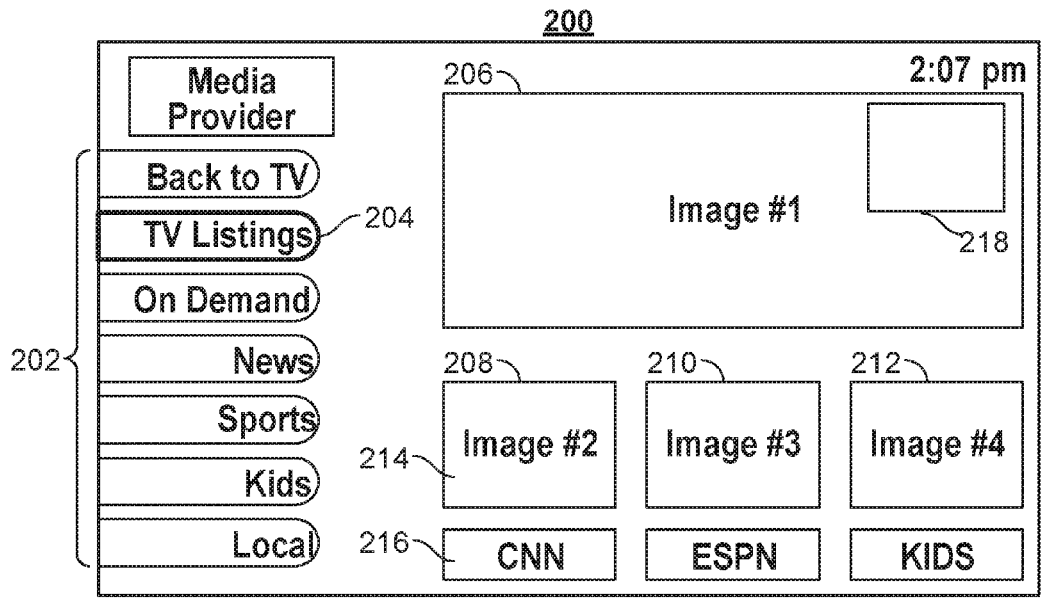
FIG. 2 shows an illustrative media guidance application that may be used to adjust user settings in accordance with some embodiments of the disclosure.

FIGS. 1 and 2 show illustrative display screens that may be used to provide media guidance data. The display screens shown in FIGS. 1 and 2 may be implemented on any suitable user equipment device or platform. For example, the display screens shown in FIGS. 1 and 2 may correspond to display screens that may be manipulated in response to commands based on user brain activity as discussed herein. While the displays of FIGS. 1 and 2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, a selectable option ("Brain Activity") similar to 204 (not shown) may be selected to initiate brain monitoring of a user. In some embodiments, selecting the selectable option ("Brain Monitor") may switch a user device configured to monitor the brain activity of a user from a first mode (e.g., a "sleep mode") to a second mode (e.g., an "active mode").

In some embodiments, in response to the selectable option ("Brain Monitor") being selected, the media guidance application has also generated a display of icon 218, which instructs a user regarding the monitoring of brain activity. For example, icon 218 instructs a user to blink his/her eyes in order to select a highlighted option. In another example, icon 218 may instruct a user to glance up and down several times in a row to activate a scrolling function. For example, the media guidance application may scroll all available media guidance application operations, select a particular operation to monitor for, etc. based on receiving a corresponding eye blink pattern from a user. In another example, icon 218 may instruct a user to glance to the right to move a selection window over to the option that is displayed to the right of the currently highlighted option. Similarly, icon 218 may instruct a user to glance to the left in order to move the selection window over to the option that is displayed to the left of the currently highlighted option.

In other embodiments icon 218 (or any other icon that may be displayed in display 200) may alert a user to events that just occurred on the user's other devices (e.g., smartphone, tablet, laptop, desktop). Additionally, this alert may also provide the user with options for controlling one or more of the user's devices. For example, icon 218 may indicate that the user's smartphone just received an incoming call and provide options for the user to answer or ignore the call. In another example, icon 218 may indicate that the user's tablet just received an incoming video chat request and provide options for answering or ignoring the video chat request. In yet another example, icon 218 may indicate that the user's laptop just received an important new email and provide options for creating a reply email or setting a reminder to respond to the email.

As used herein, an "eye blink pattern" refers to a combination of blinks of a user and pauses before or after a blink that causes the media guidance application to perform an action. For example, the media guidance application may be configured to respond to particular eye blink patterns, which may be detected while monitoring brain activity. For example, the media guidance application may monitor alpha bands (e.g., typically associated with eye blinking) in the globus pallidus of the basal ganglia (e.g., the area of the brain typically associated with controlling eye blinking) of a user in order to detect an eye blink pattern. It should be noted that in some embodiments, an eye blink pattern may include only a single blink. For example, the single blink may involve keeping the eyes closed for a sustained period of time.

In display 200 listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listings 208, 210, and 212 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on). As discussed above, display 200 may display additional icons/notifications/messages like icon 218 which provide a user with options to control his/her various devices.

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
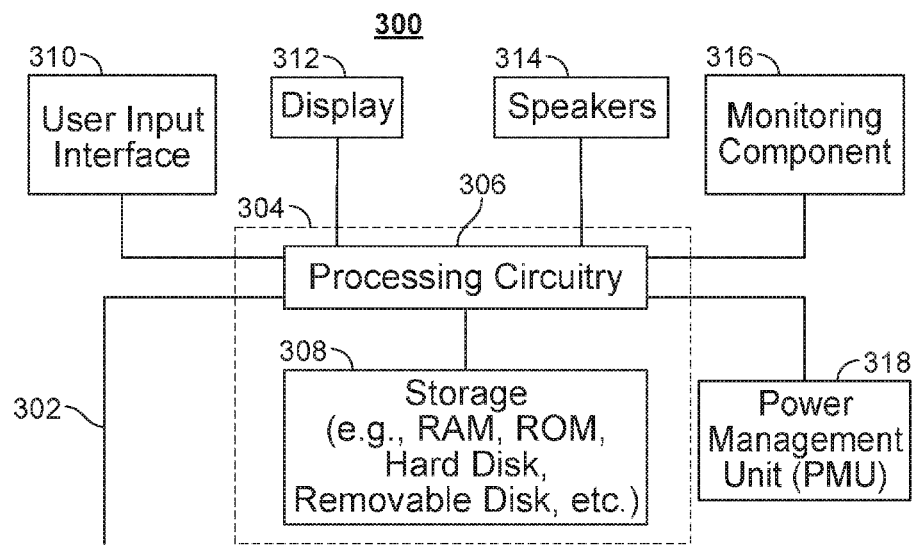
FIG. 3 is a block diagram of an illustrative user device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Control circuitry 304 may also instruct monitoring component 316. Monitoring component 316 may include one or more additional sub-components (e.g., an EEG, EMG, etc.) for monitoring brain activity of a user. Monitoring component 316 may transmit updates (e.g., associated with brain activity) of a user to control circuitry 304. Control circuitry 304 may compare the updates to data related to brain activity (e.g., threshold ranges, frequency ranges, etc.) of the user and/or other users stored on storage 308 (e.g., to determine whether or not the brain activity of the user corresponds to a particular threshold range and/or mood, attentiveness level, etc.).

It should be noted, monitoring component 316 may, in some embodiments, be located on a separate device in communication with the device upon which a media guidance application (and control circuitry 304) is implemented. For example, in some embodiments, monitoring component 316 may communication with device 300 via a communications network (e.g., communications network 414 (FIG. 4)).

Control circuitry 304 may also instruct power management unit (PMU) 318 to switch user equipment device 300 from a first power mode of operation to a second power mode of operation. Alternatively, PMU 318 may receive instructions to perform the switching directly over communications network 414. For example, monitoring component 316 may send PMU 318 a message telling it to switch user equipment device 300 from a first power mode to a second power mode.

As referred to herein, a first power mode may be a low power mode of operation. A first power mode may be understood to be a sleep mode, a standby mode, a power-off mode, a dormant mode, or a low-power mode. A low-power mode may refer to a mode of operation in which user equipment device 300 has sufficient power to perform basic computation (e.g., compute whether an update should be performed) using processing circuitry 306 but insufficient power to perform more power-intensive tasks such as communicate with remote devices (e.g., media content source 416 (FIG. 4)) over communications network 414 (FIG. 4) and/or have limited capability to identify brain activity. As referred to herein, a second power mode may be a high power mode of operation. A second power mode may be understood to be an awake mode, an active mode, a full-power mode, a high-power mode, or an update mode, where a device operating at a second power mode has sufficient power to provide updates on brain activity of a user sufficient for determining a mood, attentiveness level, etc. A device operating at a second power mode may consume more power than when operating at a first power mode. In some embodiments, device 300 may operate at a third power mode, in which the power consumed at the third power mode is greater than that consumed at the first power mode but less than that consumed at the second power mode. A third power mode may be an update mode, in which device 300 operates at enough power to perform updates but not at full-power mode to perform media guidance application operations. A third power mode may also refer to a low-power mode, as described above. All three modes of operation (e.g., first power mode, second power mode, third power mode) may be used interchangeably within the present disclosure.

Once user equipment device 300 is switched to a second power mode of operation, control circuitry 304 updates the media guidance application with data from monitoring component 316 and stores the data in storage 308. As referred to herein, switching refers to activating a component of circuitry within user equipment device 300 that corresponds to a desired power mode of operation. Switching may be performed by PMU 318 to switch user equipment device 300 from a first power mode to a second power mode. A first power mode may correspond to a first circuitry component, and a second power mode may correspond to a second circuitry component. As referred to herein, switching from a first power mode to a second power mode involves deactivating the first circuitry component and activating a second circuitry component.

PMU 318 monitors and manages the power consumption of user equipment device 300. PMU 318 may be configured to monitor the current level of power consumption of user equipment device 300 based on device characteristics such as, but are not limited to, battery usage information, screen brightness, screen saver settings, central processing unit (CPU) power usage, graphic processing unit (GPU) power usage, integrated processor power usage, number of applications currently running on user equipment device 300, number and frequency of recordings scheduled to be performed on user equipment device 300, and the current power mode of operation (e.g., first power mode, second power mode) in addition to brain activity. More specifically, PMU 318 monitors the power state of user equipment device 300 to determine when device 300 switches from a first power mode to a second power mode. In some embodiments, PMU 318 may reside on user equipment device 300 as a component of control circuitry 304. In other embodiments, PMU 318 may be a unit that is external to user equipment device 300. In these cases, PMU 318 may communicate with user equipment device 300 by sending and receiving instructions from control circuitry 304.

PMU 318 may perform the switching in response to various conditions, based on instructions from control circuitry 304. In some embodiments, control circuitry 304 may receive an indication to switch user equipment device 300 from a first power mode to a second power mode. For example, control circuitry 304 may receive a request from a user input interface 310 or monitoring component 316 to perform the switching. In another example, control circuitry 304 may receive over communications network 414 (FIG. 4) via path 302 a message from a remote server indicating that user equipment device 300 should be switched to a second power mode of operation. In each of the aforementioned examples, control circuitry 304 may instruct PMU 318 to switch user equipment device 300 to a second power mode of operation in response to the requests and messages received. These messages and/or requests may include a time field which indicates a future time at which control circuitry 304 should switch device 300 to a second power mode to receive updates over network 414 (FIG. 4) and/or perform updates that are stored in storage 308. This time field may set a timer to switch user device 300 to a second power mode at a specified time. The time field may also set a timer to switch user device 300 to a first power mode at a specified time period when no updates will be sent to device 300.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
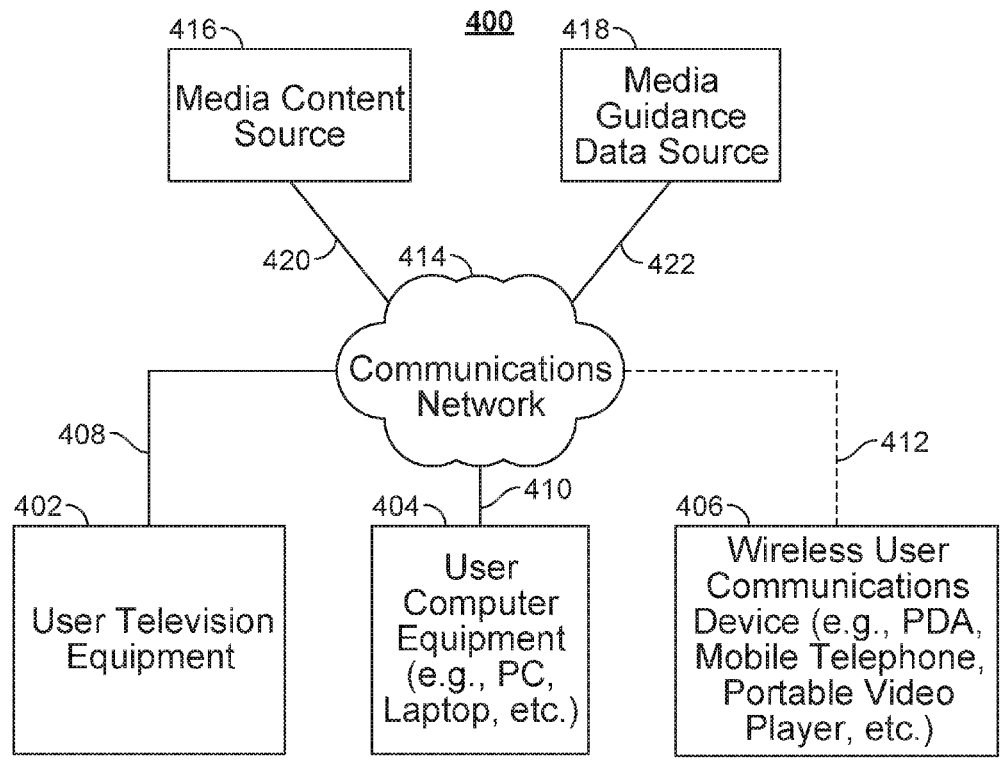
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
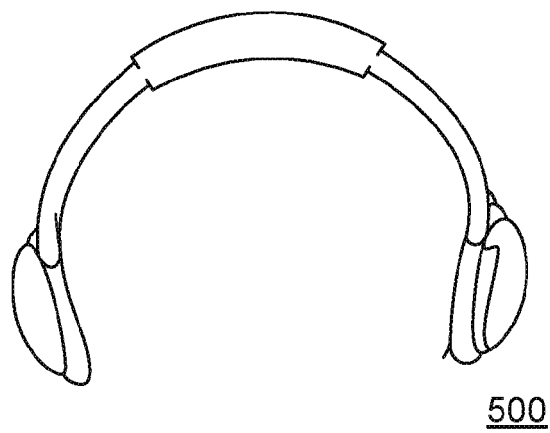
FIG. 5 shows multiple user devices that may be associated with monitoring brain activity in accordance with some embodiments of the disclosure.
Figure 5:
Figure 5:
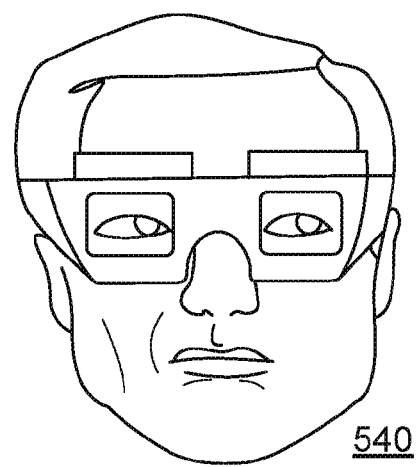

FIG. 5 shows multiple user devices that may be associated with monitoring brain activity. For example, a user device may be fashioned as a form of headwear. In some embodiments, the user device implements an application that provides an integrated user interface for controlling a user's various devices (e.g., smartphone, tablet, laptop, desktop computer). In some instances, this application is a media guidance application which displays options for controlling the user's various devices as part of a media guidance screen (e.g., as part of display 200 in FIG. 2).

For example, user device 500 is fashioned as a headset, user device 520 is fashioned as a hat/helmet, and user device 540 is fashioned as eye glasses. It should be noted that a user device configured to monitor brain activity as described herein may be fashioned as any headwear. Furthermore, in some embodiments, a user device may not be fashioned as headwear, but instead may be configured as any device capable of monitoring brain activity of a user. For example, any device which may incorporate and/or have access to an EEG, EMG, and/or other means for monitoring brain activity described herein may constitute a user device.

In some embodiments, user devices 500, 520, and 540 may further include additional sub-components (e.g., sub-components of monitoring component 316 (FIG. 3)), which may monitor brain activity on one or more regions of the brain. Sub-components may include electrodes or other features that may attach to the various portions of a user. Furthermore, in some embodiments, sub-components may extend and/or retract during various modes of the user device in order to accommodate the comfort of the user.

In some embodiments, user devices 500, 520, and 540 may be battery-powered in order to provide a user with additional mobility. Furthermore, user devices 500, 520, and 540 include multiple modes, each corresponding to different power consumption levels and/or sensitivity levels.

Each of the user devices 500, 520, and 540 is interchangeable with user device 300 in FIG. 3. In some embodiments, control circuitry 304 of user device 300 may receive commands from user input interface 310, and/or speakers/microphone 314. In some instances, user input interface 310 may communicate with monitoring component 316 to detect a user's facial or brain activity inputs. For example, facial gestures include, but are not limited to, eye blinks, frowns, smiles, and facial twitches. Brain activity inputs include, but are not limited to, brain wave patterns that correspond to a person's affirmative/negative responses, mood, and/or attention level. In response to receiving commands from 310, 314, and/or 316, control circuitry 304 may send instructions back and forth over communication path 302 to the user's other devices. These other user devices may include one or more of user television equipment 402, user computer equipment 404, and wireless user communications device 406. For example, user device 500, 520, and/or 540 may transmit instructions over communication path 302 to another user device 402, 404, and/or 406 in response to receiving a selection of an option provided in a media guidance application implemented on user device 500, 520, and/or 540. Examples of these options were described in relation to icon 218 in connection to the discussion of FIG. 2. Additionally, these options described in relation to icon 218 may also be displayed on display 312 of user device 500, 520, or 540. Display 312 may be a heads-up display that is mounted on the head of the user (e.g., optical head-mounted display).

In some embodiments, each of the user devices 500, 520, and 540 may contain a microphone 314 for receiving voice commands. In some instances, microphone 314 may be or include a user input interface 310. For example, user input interface 310 may receive a user selection of an option (e.g., icon 218 in FIG. 2) to answer a phone call on the user's smartphone 406. In response to receiving the user selection of the option, user input interface 310 may instruct control circuitry 304 to send an instruction to the user's smartphone 406 to pick up the incoming phone call received at 406. Subsequently, control circuitry 304 may establish a connection between user device 500, 520, or 540 and the user's smartphone 406. Once the connection is established, the user may commence conversation through microphone 314 over the established connection.

In some embodiments, user input interface 310 may receive a user selection of an option (e.g., icon 218 in FIG.

2) to respond to a text message alert received on the user's wireless user communications device 406. In response to receiving the user's selection of the option, user input interface 310 may instruct control circuitry 304 to activate microphone 314 to receive voice commands from the user. Once microphone 314 receives the user's entire message, microphone 314 may send the message to processing circuitry 306 to convert the received voice message into a text message. Processing circuitry 306 may conduct a speech recognition process to convert the voice message into a text message. Alternatively, control circuitry 304 may send the voice message to a remote server to convert the voice message into a text message, and the remote server may conduct a speech recognition process to convert the voice message into a text message. Control circuitry 304 may send an instruction over communication path 302 to user device 406 to activate the text messaging application on user device 406. In response to receiving an indication from user device 406 that the text messaging application is activated, control circuitry 304 may transmit the text message (resulting from conversion of the voice message provided by the user) to user device 406.

In some embodiments, user input interface 310 may receive a user selection of an option (e.g., icon 218 in FIG. 2) to answer an incoming important email on the user's laptop. Similar to the above discussion involving responding to a text message through voice commands, microphone 314 may receive a user's dictated voice message. Processing circuitry 306 or a remote server may convert that voice message into a textual reply email and send the email to device 406 over communication path 304 once user device 406 activates its email application.

In some embodiments, user input interface 310 may receive a user selection of an option (e.g., icon 218 in FIG. 2) to respond to a video chat request originating from user computer equipment 404 or wireless communications device 406 (e.g., tablet, smartphone). In response to receiving the user selection of the option, user input interface 310 may instruct control circuitry 304 to send an instruction to user device 404 or 406 to accept the video chat request. In response to receiving an indication from user device 404 or 406 that the video chat request was accepted and the video chat session opened, control circuitry 304 may activate a camera on user device 500, 520, of 540. Once the camera is activated, the user may commence the video chat. As illustrated by the above-mentioned embodiments, user devices 500, 520, and 540 allow a user to conveniently and seamless interface with the user's other devices 402, 404, and 406 without ever having to physical relocate and directly manipulate that other user device.

Figure 6:
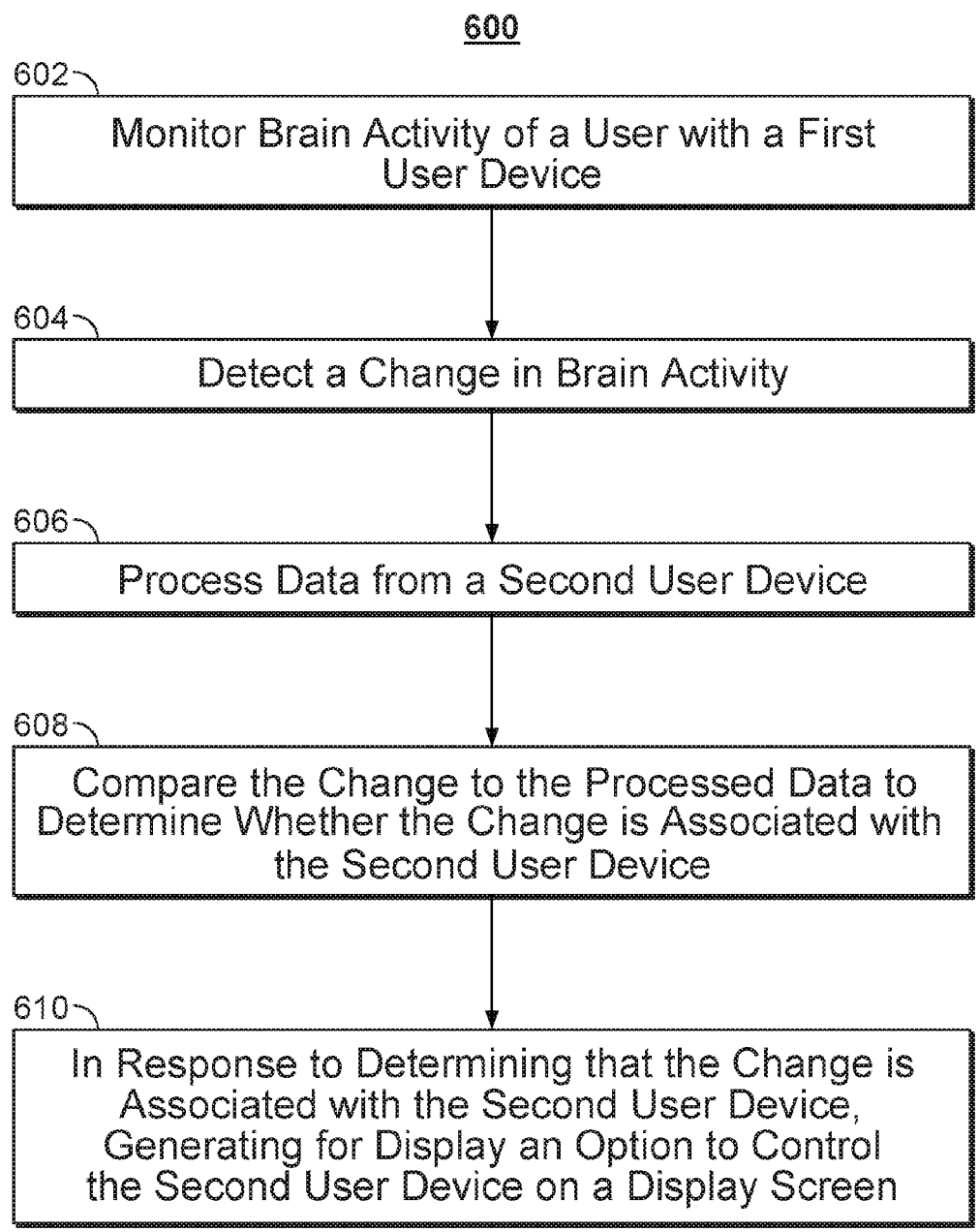
FIG. 6 is a flow-chart of illustrative steps involved in generating for display an option to control a user device in response to determining that a detected change in brain activity is associated with that user device in accordance with some embodiments of the disclosure.

FIG. 6 is a flow-chart of illustrative steps involved in generating for display an option to control a user device in response to determining that a detected change in brain activity is associated with that user device in accordance with some embodiments of the disclosure. It should be noted that process 600 or any step thereof, could be displayed on, or provided by, any of the user devices shown in FIGS. 3, 4 and 6 in response to brain activity of a user. For example, process 600 may be executed by control circuitry 304 (FIG. 3) on user device 300 which may be configured as headwear 500, 520, and/or 540 (e.g., as shown in FIG. 5). In addition, one or more steps of process 700 may be incorporated into or combined with one or more steps of any other process (e.g., as described in FIG. 7).

At step 602, monitoring component 316 monitors the brain activity of a user with a first user device 300. In some embodiments, the first user device may be configured as headwear. Illustrative examples of such headwear were discussed above in relation to user devices 500, 520, and 540 (FIG. 5). In some embodiments, monitoring component 316 is implemented by an application (e.g., media guidance application) on the first user device. Monitoring component 316 of user device 300 may monitor various characteristics of brain activity. For example, these characteristics include, but are not limited to, current frequency range of voltage fluctuations in the brain and/or electrical activity of muscles near the brain at rest and during contraction.

In some embodiments, monitoring component 316 may continuously monitor the brain activity of a user using an EEG, EMG, or suitable device for monitoring brain waves (e.g., incorporated as a sub-component of monitoring component 316. Alternatively, the media guidance application may periodically poll the brain activity of a user (e.g., on a predetermined schedule and/or in response to a user input, (i.e., selecting selectable option ("Brain Monitor") in FIG. 2). The brain activity monitored by monitoring component 316 is stored by storage circuitry 308.

In some embodiments, the media guidance application may trigger (e.g., via control circuitry 304 (FIG. 3)) various modes for monitoring brain activity, in which each mode is associated with a different power consumption level and/or sensitivity level. For example, the media guidance application (e.g., via control circuitry 304 (FIG. 3)) may induce different modes of a monitoring component (e.g., monitoring component 316 (FIG. 3)) in response to instructions and/or information received from a power management unit (e.g., PMU 318 (FIG. 3)) in order to extend the life of an energy storage device or limit the exposure of a user to activities of the monitoring component 315.

At step 604, control circuitry 304 detects a change in brain activity of the user based on brain activity monitored by monitoring component 316. For example, the monitored brain activity may exhibit a change in the user's beta wave patterns. Control circuitry 304 compares this new beta wave pattern to the control beta wave pattern associated with normal concentration level. In some instances, control circuitry 304 compares the average amplitude of the new beta wave pattern to the average amplitude of the control beta wave pattern. In response to determining that the average amplitude of the new beta wave pattern is higher than the average amplitude of the control beta wave pattern, control circuitry determines that the user's attention level has dropped. In some embodiments, control circuitry 304 computes a first attention level corresponding to a user interacting with the first user device under normal conditions. This first attention level may be re-calibrated for each different user and each different first user device. Control circuitry 304 also continuously receives brain activity data from the monitoring component 316 and uses the received brain activity data to continuously re-compute a second attention level, which corresponds to the user's most current attention level. The second attention level may be re-computed at every predetermined interval of time (e.g., 1 millisecond, 1 second, etc.). This predetermined interval may vary depending on the energy saving policies of the user's set-top-box, first user device, media guidance application, brain activity monitor equipment implementing monitoring component 316. For example, to save more energy, the second attention level may only re-computed over a longer stretch of time (e.g., every 10 minutes as opposed to every millisecond). In response to determining that the second attention level is lower than the first attention level (e.g., control attention level), by a predetermined margin (e.g., corresponding to statistical significance), control circuitry 304 determines that the user's attention has dropped.

At step 606, control circuitry 304 processes data from a second user device. The second user device may be any of user devices 402, 404, and 406 in FIG. 4. In some embodiments, control circuitry 304 sends a message over communication path 302 to the second user device 402, 404, or 406. In some instances, this message may be a request for data corresponding to events that occurred at the second user device within a certain period of time in the past (e.g., 1 minute, 5 seconds, 100 milliseconds, etc.). Alternatively or additionally, control circuitry 304 may receive data from the second user device without requesting the data from the second user device. In some instances, control circuitry 304 may send this event data to monitoring component 316 to determine whether the detected change in activity corresponds to any of the received event data from the second user device. This determination is explained in further detail in relation to the discussion of below (see, e.g., steps 606 and 608). This event data may include one or more fields about the event. The fields could be, but are not limited to, the time the event occurred on the second user device, the name of the event, a list of possible options for responding to the event, and other information that may be relevant to the particular event type. For example, if the event was a phone call, the time the event occurred may be 12:00:45, the name of the event would be "phone call", the possible options for responding could be "answer", "ignore", and "call back later" (which would automatically set up a reminder to the user to call back the person who placed the call at a later time.

In response to receiving the data from the second user device, control circuitry 304 may instruct processing circuitry 306 to commence processing of the data by extracting certain relevant fields from the data. In some embodiments, this processing may involve identifying the name of the event (or event type using an event identifier) as well as the time the event occurred.

In some embodiments, this processing may involve retrieving various types of data from the second user device. For example, processing circuitry 306 may instruct control circuitry 304 to request image data, voice/audio data, video data, message data, accelerometer data, location data, light sensitivity data, notification data, reminder data, device identification information, user account data, application data, usage status, etc., from the second user device in addition or independently of the event data. In response to receiving these above-mentioned types of data, processing circuitry 306 may analyze one of a combination of the various types of non-event type data to determine whether any or a particular event occurred at the second user device. For example, in response to determining from the image data (e.g., camera uploads, stored photos) that the second user device recently stored new photos, processing circuitry 306 determines that the event of "taking a photo" recently occurred at the second user device. In another example, in response to determining from the reminder data that a reminder was scheduled to recently alert a user (e.g., remind the user at 8 A.M. that he has a dentist appointment at 10 A.M.), processing circuitry 306 determines that the event of "reminder alert" recently occurred at the second user device. In another example, in response to determining from the audio/voice data that a phone ring was recently detected, processing circuitry 306 determines that the event of "phone ring" recently occurred at the second user device. In another example, in response to determining from the audio/voice data and or the user's account data (e.g., social media feed) that an environmental distraction recently occurred in the vicinity of the user's second device (e.g., door knock, baby crying, person yelling, oven timer, microwave timer, laundry buzzer, conversations of new people in the room), processing circuitry 306 determines that the general event "environmental distraction" occurred recently in the vicinity of the second user device. In another example, in response to determining from the message data that a text message was recently received by the second user device, processing circuitry 306 determines that the event "text message" recently occurred at the second device.

In some embodiments, this processing may involve determining which user devices a user is not currently interacting with (i.e., remote to the user) and requesting data from those user devices to be sent to the first user device. Processing circuitry 306 may determine which user devices a user is not currently interacting with by inspecting a list of user devices that are associated with the user. This list may be stored locally in storage 308 or on a server that is remote to the user. For example, the list of user devices may be associated with accounts of the user. These accounts may be online accounts (e.g., shopping accounts, bank accounts, email accounts) and/or accounts that are directly linked to the user's phone (e.g., email accounts, app store accounts, etc.). The list may include information regarding the usage status of each of the user's devices. In some embodiments, processing circuitry 306 may determine the usage status of a particular device on the by determining whether the user has logged into any of his/her accounts that are directly linked to the physical user device. In some embodiments, processing circuitry 306 may periodically ping each user device on the list of user devices to request its status. Subsequently, processing circuitry 306 may receive a response message from one or more the user devices indicating the user's usage status. For example, if the processing circuitry 306 receives no response or receives a response of "idle" from a user device on the list, then processing circuitry 306 determines that the user is not currently interacting with that sender user device. In another example, if processing circuitry 306 receives an acknowledgement response or receives a response of "active" from a user device on the list, then processing circuitry 306 determines that the user is currently interacting with that sender user device. Processing circuitry 306 may then update the usage status of the corresponding user device on the list of user devices based on these received responses.

In response to determining the usage status of the user devices in the list of user devices, processing circuitry 306 instructs control circuitry 304 to retrieve data from all of the user devices which the user is not currently interacting with. Any of these user devices may be the second user device.

Once processing circuitry 306 completes this processing of received data from the second user device, control circuitry 304 may store the processed data in local storage 308 of user device 300 and proceed to step 606.

At step 608, control circuitry 304 compares the detected change in brain activity to the data from the second user device 402, 404, or 406 to determine whether the change is associated with the second user device. In some embodiments, control circuitry 304 performs this comparison by cross-referencing the data from the second user device in a database which stores associations between various types of device data with various types of changes in brain activity. For example, the database may associate each user device event (e.g., phone call, text message, video chat request, email alert, notifications, reminders, etc.) with one or more brain wave patterns (e.g., alpha, beta, gamma waves) and/or or numerical measurements of certain features of brain activity (e.g., frequency, amplitude, period, peak frequency, peak amplitude, average frequency, average amplitude). These brain wave patterns and numerical measurements of brain activity represent a typical response of a human brain to that particular event type. Control circuitry 304 may determine from the associations from the database that a particular type of data is associated with a particular type of change in brain activity. For example, control circuitry may determine that a phone call corresponds to a certain peak frequency and peak amplitude response of the brain.

In some embodiments, control circuitry 304 may determine the type of event (e.g., via an event identifier) that occurred at the second user device based on changes in brain states. These brain states may be monitored and continually re-computed by the first user device (e.g., by monitoring component 316). For example, control circuitry 304 may determine that the user's brain state A corresponds to reading particular content on a screen by analyzing brain activity in the parts of the brain responsible for processing visual stimulus and concentration. Brain state A may correspond to the user's default brain state when interacting with the first user device. In another example, control circuitry 304 may determine that brain state B corresponds to a phone ring by detecting fluctuations in the lobes of the brain that are associated with hearing and sound processing. Control circuitry 304 may analyze these fluctuations to determine that these fluctuations correspond to sudden noises (e.g., phone rings).

In some embodiments, control circuitry 304 performs the comparison at step 608 by determining that the time an event occurred at the second user device corresponds to the time the change in brain activity was detected. For example, if control circuitry 304 determines from the data that a phone call occurred at 12:00:45 and shortly afterwards, the change in brain activity was detected at 12:01:00, then control circuitry 304 determines that the phone call likely caused the detected change in brain activity of the user.

At 610, in response to determining that the change in brain activity is associated with the second user device (performed at step 608), control circuitry 304 instructs a display of an option to be generated to control the second user device on a display screen. In some embodiments, the display screen is a component of a third user device. The third user device may be a television set 402 on which the user is currently watching a program. Control circuitry 304 may instruct a media guidance application implemented on the third user device to display the option for the user. Various types of options are described in further detail in relation to icon 218 in FIG. 2. This option may be displayed as an overlay over the user's current programming or separate screen which replaces the currently viewed screen. In some instances, control circuitry 304 may instruct the media guidance application implemented on the third user device to pause programming on the third user device in order to display the option (e.g., by determining which channel the TV is currently set to). Control circuitry 304 may additionally instruct the media guidance application to display another prompt asking the user whether to pause/continue and/or record the program. For example, control circuitry 304 may determine which prompt to instruct the media guidance application to display based on information retrieved from a cross-referencing database. The cross-referencing database may associate various types of situational conditions with various types of media guidance application prompts. For example, in response to determining that the user is currently watching TV (e.g., based on monitored brain state), control circuitry 304 may display the prompt of asking the user whether he/she wishes to pause/record the currently watched program. In this scenario, control circuitry 304 may have determined to instruct the display of a pause/record prompt because the situational condition "currently watching TV" was cross-referenced with the pause/record prompt in the cross-referencing database. In another example, in response to determining that the user is reading an email, control circuitry 304 may instruct that the display of the program be minimized because the situational condition "reading email" is cross-referenced with "program minimization" in the cross-referencing database. This embodiment is particularly convenient and desirable for users who wish to control their other user devices with minimal interruption to their television viewing experience, as the user is not required to physically locate and directly manipulate those other devices in order to respond to events on those devices.

In some embodiments, control circuitry 304 instructs the option to be displayed on the heads-up display (e.g., optical head-mounted display) 312 of the first user device 300, which may be any of user devices 500, 520, and 540.

Subsequent to the step 610 (not shown in FIG. 6), the user may select the displayed option through various types of user inputs in order to control the second user device. This selection process and subsequent control of the second user device was described in detail in connection with FIG. 5.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

Figure 7:
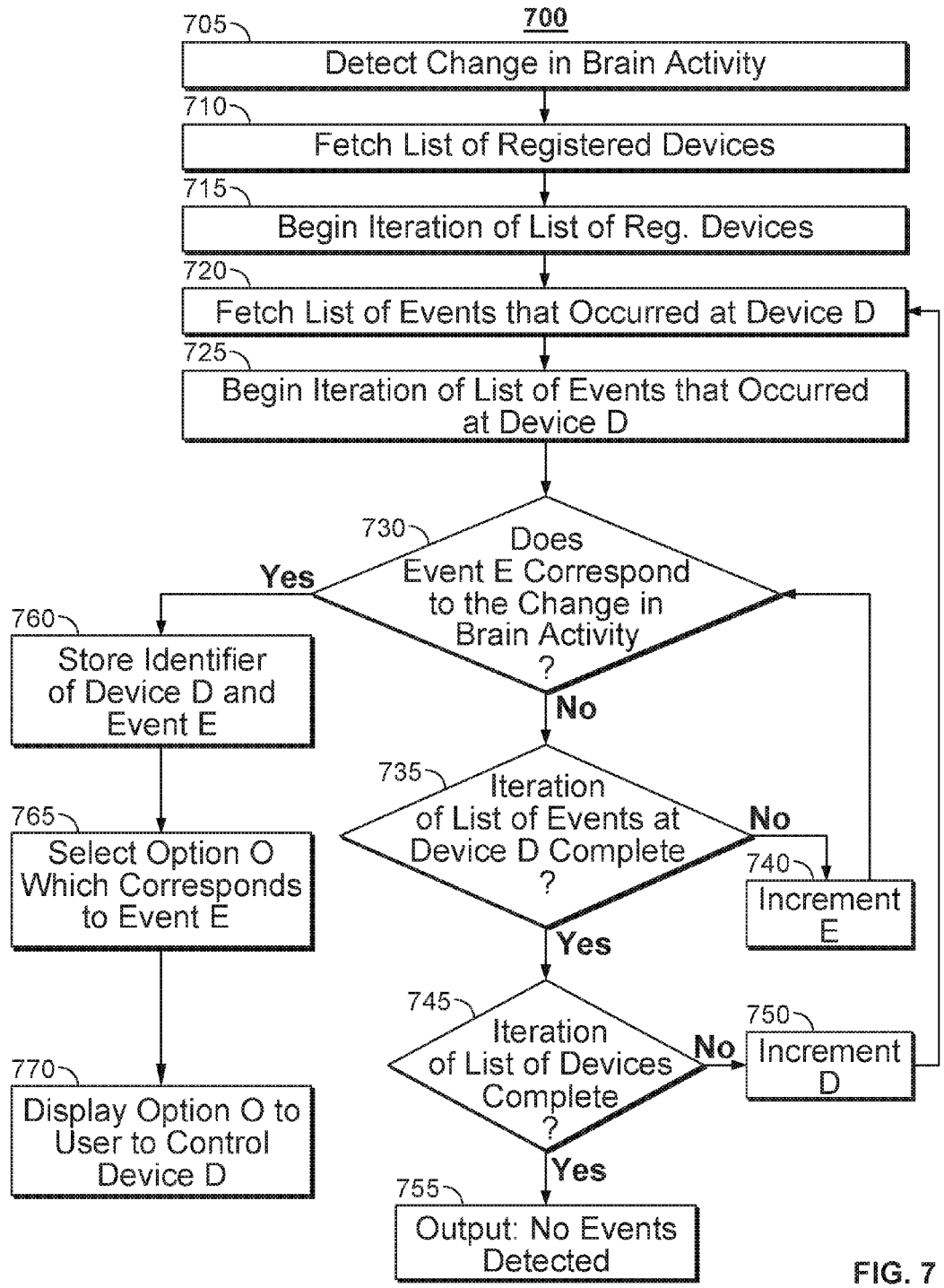
FIG. 7 is a flow-chart of illustrative steps involved in determining which event from which user device corresponds to a detected change in brain activity in accordance with some embodiments of the disclosure.

FIG. 7 is a flow-chart of illustrative steps involved in determining which event from which user device corresponds to a detected change in brain activity in accordance with some embodiments of the disclosure. It should be noted that process 700 or any step thereof, could be displayed on, or provided by, any of the user devices shown in FIGS. 3, 4 and 6 in response to brain activity of a user. For example, process 700 may be executed by control circuitry 304 (FIG. 3) on user device 300 which may be configured as headwear 500, 520, and/or 540 (e.g., as shown in FIG. 5). In addition, one or more steps of process 700 may be incorporated into or combined with one or more steps of any other process (e.g., as described in FIG. 6).

At step 705, control circuitry 304 detects a change in a user's brain activity. In some embodiments, step 705 may corresponds to step 604 in FIG. 6, as discussed above.

In response to detecting a change in brain activity, control circuitry 304 fetches a list of registered user devices 402, 404, and/or 406 at step 710. User devices may be automatically registered when they connect to the wireless network that the user is currently using. These devices may be registered to one or multiple accounts of the user. For example, these accounts may include, but are not limited to, the user's email account, app store account, and any online accounts. These accounts may be managed by a manager application that is implemented on the first user device (e.g., user device 500, 520, or 540). This manager application may provide remote access to software applications running on the user's first device. For example, the manager application may be linked to the user's email applications, smartphone applications, voicemail applications, video chat applications, text message applications, alarm application, alert applications, calendar application, etc. The list of registered devices may be stored on the first user device in storage 308 or on a server that is remote to the user.

At step 715, control circuitry begins iterating through the list of the registered user devices. The user device that corresponds to the current iteration of devices is named device D. Going through the list one by one, control circuitry 304 fetches a list of events that occurred at user device D (e.g., 402, 404, 406) at step 720. The list of events may be stored on user device D in storage 308 or in storage on a server that is remote to user device D. At step 725, control circuitry 304 begins iterating through each event listed in the list of events that occurred at user device D. The event that corresponds to the current iteration of events is named event E. For each event that is listed, control circuitry 304 performs the following sequence of checks.

At step 730, control circuitry 304 determines whether event E (e.g., phone call) corresponds to the detected change in brain activity (from step 705). This step was described in detail in relation to step 608 in FIG. 6. For example, control circuitry 304 may determine that event E corresponds to a detected change in brain activity if event E occurred at a time that corresponds closes to a time at which the change in brain activity was detected. In another example, control circuitry 304 may determine that event E corresponds to a particular detected change in brain activity by cross referencing wave patterns of the detected change with a list of associated events in a cross-referencing database. In response to determining that event E does correspond to the detected change in brain activity, control circuitry 304 skips the rest of the steps 735-755 and proceeds to step 760. At step 760, control circuitry 304 stores an identifier of device D and an identifier of event E in storage 308. This device identifier may be any information that is used to distinguish one registered device from another, including but not limited to name, IMEI, IMSI, and serial manufacturer number. The event identifier may be any information that is used to distinguish one event from another on the list of events, including but not limited to name (e.g., "phone call"), process ID, generated by the second user device, and a combination of descriptors and numerical identifiers.

At step 765, control circuitry 304 selects an option O that corresponds to event E from a list of possible options to control the second user device. In some embodiments, multiple options corresponding to event E may be selected. In some embodiments, this option may be retrieved from a cross-referencing database which associates options with events. The cross-referencing database may associate multiple options to a given event. For example, the cross-referencing database may associate an option to "answer phone call", an option to "ignore phone call", and an option to "call back later" (which automatically sets a reminder for the user to call back) with the event "phone call". In another example, the cross-referencing database may associate an option to "reply to email", an option to "reply to email later" (which automatically sets a reminder for the user to reply), an option to "move to trash", an option to "archive", and any other options that may appropriately be provided in an email application, to the event "email received". In another example, the cross-referencing database may associate any or all events with a fast-access playback option and an option to generate a user interface to manage the devices. For example, the fast-access playback option allows a user to playback a program in case portions of the program were missed due to the interruption caused by event E at device D (e.g., phone call). The detection of any event may also trigger the display of a user interface on the first user device (e.g., wearable computer via a head-mounted display) or the third user device (e.g., television set screen). This interface may provide any of the above-mentioned options for the user to select to control the user's various remote devices. Generally, the cross-referencing database may associate any list of options that are normally provided, in any application, for handling a given event. This cross-referencing database may be stored in local storage 308 of the second user device and/or the first user device. Alternatively, the cross-referencing database may be stored in storage on a server that is remote to the first and second user devices.

In some embodiments, control circuitry 304 selects an option O which corresponds to event E based on event data associated with event E, which is retrieved from the second user device. For example, the event data for event E may include a list of appropriate options for handling the event. Event data was described in detail in relation to step 606 of FIG. 6.

At step 770, control circuitry 304 instructs the display of option O selected at step 765 (or multiple options selected at step 765). The selection option(s) may be displayed on a display screen of the first user device 312 or the third user device. This option display was described in detail in relation to step 610.

Going back to step 730, alternatively, in response to determining that event E does not correspond to the detected change in brain activity (from step 705), control circuitry 304 proceeds to step 735. At step 735, control circuitry 304 determines whether the iteration (begun at step 725) of the list of events that occurred at device D is complete (i.e., whether control circuitry 304 has iterated through each and every event in the event list). In response to determining that the iteration begun at step 725 is not complete, control circuitry 304 increments current event E at step 740 and performs step 730 again for the newly incremented event E. Alternatively, in response to determining that the iteration begun at step 725 is complete, control circuitry 304 proceeds to step 745.

At step 745, control circuitry 304 determines whether the iteration (begun at step 715) of the list of registered user devices is completed (i.e., whether control circuitry 304 has iterated through each and every user device in the registered devices list). In response to determining that the iteration begun at step 715 is not complete, control circuitry 304 increments current device D at step 750 and performs step 720 again for newly incremented device D. Alternatively, in response to determining that the iteration begun at step 715 is complete, control circuitry 304 proceeds to step 755 and produces an output indicating that no events were detected. In some embodiments, control circuitry 304 reaches step 755 of process 700, no option will be displayed to the user as a result of a detected change in brain activity because no event was detected as a likely cause of the change in brain activity.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for controlling user devices, comprising:
monitoring brain activity of a user with a first device;
determining the user's brain wave pattern;
detecting, using control circuitry, a change in the user's brain wave pattern;
in response to detecting the change, comparing, using the control circuitry, an average amplitude of the user's brain wave pattern to an average amplitude of the user's control brain wave pattern;
in response to determining that the average amplitude of the user's brain wave pattern is higher than the average amplitude of the user's control brain wave pattern, determining a drop in the user's attention level;
in response to determining the drop, retrieving, using the control circuitry, a list of registered user devices;
for each of a plurality of registered user devices in the list, retrieving, using the control circuitry, event data from each of the plurality of registered user devices;
for each of a plurality of events in the event data, retrieving, using the control circuitry, a time corresponding to each of the plurality of events in the event data;
comparing, using the control circuitry, a time of the drop to the time corresponding to each of the plurality of events in the event data;
determining, based on the comparison, that the drop is associated with an event of the plurality of events in the event data;
in response to determining that the drop is associated with the event of the plurality of events in the event data, storing an event identifier corresponding to the event and a device identifier corresponding to a device of the plurality of registered devices corresponding to the event;
retrieving, from storage, an option to control the device of the plurality of registered devices, wherein the option corresponds to the device identifier and the event identifier; and
generating for display, on a display screen, the option to control the device of the plurality of registered devices.

2. The method of claim 1, wherein monitoring the brain activity of the user comprises monitoring the brain activity in a region of a brain of the user associated with attention.

3. The method of claim 1, further comprising, in response to determining the drop, initiating a low-power mode on the first device.

4. The method of claim 1, wherein each of the plurality of registered user devices is connected to a wireless network that the user is currently using.

5. The method of claim 1, wherein the option to control the device of the plurality of registered devices comprises one of:
an option to answer a phone call;
an option to reply to an email; and
an option to reply to a text message.

6. The method of claim 1, further comprising:
generating for display, on the display screen, an option to playback a portion of a program that was missed due to the drop.

7. The method of claim 1, further comprising:
monitoring the brain activity in a region of a brain of the user associated with eye blinking;
detecting an eye blink pattern; and
in response to detecting the eye blink pattern, selecting an option to control a second device corresponding to the eye blink pattern.

8. The method of claim 1, further comprising:
receiving a voice command; and
in response to receiving the voice command, selecting an option to control a third device corresponding to the voice command.

9. The method of claim 1, wherein the user's brain wave pattern comprises a beta wave pattern.

10. The method of claim 9, wherein a frequency band of the beta wave pattern comprises frequencies of 13 to 30 Hz.

11. A system for controlling user devices, comprising:
control circuitry configured to:
monitor brain activity of a user with a first device;
determine the user's brain wave pattern;
detect a change in the user's brain wave pattern;
in response to detecting a change, compare an average amplitude of the user's brain wave pattern to an average amplitude of the user's control brain wave pattern;
in response to determining that the average amplitude of the user's brain wave pattern is higher than the average amplitude of the user's control brain wave pattern, determine a drop in the user's attention level;
in response to determining the drop, retrieve a list of registered user devices;
for each of a plurality of registered user devices in the list, retrieve event data from each of the plurality of registered user devices;
for each of a plurality of events in the event data, retrieve a time corresponding to each of the plurality of events in the event data;
compare a time of the drop to the time corresponding to each of the plurality of events in the event data;
determine that the drop is associated with an event of the plurality of events in the event data;
in response to determining that the drop is associated with the event of the plurality of events in the event data, store an event identifier corresponding to the event and a device identifier corresponding to a device of the plurality of registered devices corresponding to the event;
retrieve, from storage, an option to control the device of the plurality of registered devices, wherein the option corresponds to the device identifier and the event identifier; and
generate for display, on a display screen, the option to control the device of the plurality of registered devices.

12. The system of claim 11, wherein the control circuitry is further configured to monitor the brain activity of the user by monitoring the brain activity in a region of a brain of the user associated with attention.

13. The system of claim 11, wherein the control circuitry is further configured to, in response to determining the drop, initiate a low-power mode on the first device.

14. The system of claim 11, wherein each of the plurality of registered user devices is connected to a wireless network that the user is currently using.

15. The system of claim 11, wherein the option to control the device of the plurality of registered devices comprises one of:
 an option to answer a phone call;
 an option to reply to an email; and
 an option to reply to a text message.

16. The system of claim 11, wherein the control circuitry is further configured to:
 generate for display, on the display screen, an option to playback a portion of a program that was missed due to the drop.

17. The system of claim 11, wherein the control circuitry is further configured to:
 monitor the brain activity in a region of a brain of the user associated with eye blinking;
 detect an eye blink pattern;
 in response to detecting the eye blink pattern, select an option to control a second device corresponding to the eye blink pattern.

18. The system of claim 11, wherein the control circuitry is further configured to:
 receive a voice command; and
 in response to receiving the voice command, select an option to control a third device corresponding to the voice command.

19. The system of claim 11, wherein the user's brain wave pattern comprises a beta wave pattern.

20. The system of claim 19, wherein a frequency band of the beta wave pattern comprises frequencies of 13 to 30 Hz.

* * * * *